US011838822B2

(12) United States Patent
Gundavelli et al.

(10) Patent No.: US 11,838,822 B2
(45) Date of Patent: *Dec. 5, 2023

(54) TECHNIQUES FOR SELECTING NETWORK PROTOCOLS

(71) Applicant: Cisco Technology, Inc., San Jose, CA (US)

(72) Inventors: Srinath Gundavelli, San Jose, CA (US); Indermeet Gandhi, San Jose, CA (US); Shree Murthy, San Jose, CA (US); Malcolm Muir Smith, Richardson, TX (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/846,482

(22) Filed: Jun. 22, 2022

(65) Prior Publication Data

US 2022/0322198 A1 Oct. 6, 2022

Related U.S. Application Data

(63) Continuation of application No. 17/105,266, filed on Nov. 25, 2020, now Pat. No. 11,405,843.

(51) Int. Cl.
*H04W 4/00* (2018.01)
*H04W 36/32* (2009.01)
(Continued)

(52) U.S. Cl.
CPC .......... *H04W 36/32* (2013.01); *H04W 36/30* (2013.01); *H04W 84/12* (2013.01)

(58) Field of Classification Search
CPC ..... H04W 36/32; H04W 36/30; H04W 84/12; H04W 16/18; H04W 64/003;
(Continued)

(56) References Cited

U.S. PATENT DOCUMENTS 9,551,775 B2 * 1/2017 Rangarajan ........... G01S 5/0226
9,749,806 B2 * 8/2017 Smith ................... G01S 5/0278
(Continued)

FOREIGN PATENT DOCUMENTS

WO WO2016137661 A1 9/2016

OTHER PUBLICATIONS

"Acrylic WIFI Heatmaps User Manual", retrieved on Oct. 12, 2020 at <<https://www.acrylicwifi.com/en/wlan-wifi-wireless-network-software-tools/wifi-site-survey-software-acrylic-heat-maps/user-manual/>> 102 pages.

(Continued)

*Primary Examiner* — Amancio Gonzalez
(74) *Attorney, Agent, or Firm* — Lee & Hayes, P.C.

(57) ABSTRACT

This disclosure describes techniques for selecting network protocols using heatmaps. For instance, a system may receive radio frequency information from one or more sources located within an environment. The system may then generate heatmaps using the radio frequency information, where the heatmaps represent characteristics associated with different network protocols. The characteristics may include signal strengths, throughputs, data packet drop rates, data packet retry rates, and/or the like for various locations within the environment. A user device may then receive the heatmaps from the system. Using a location of the user device and the heatmaps, the user device may determine to communicate using a network protocol from the different network protocols. The user device may then establish a connection using the network protocol.

20 Claims, 10 Drawing Sheets

(51) Int. Cl.
*H04W 36/30* (2009.01)
*H04W 84/12* (2009.01)

(58) Field of Classification Search
CPC ..... H04W 48/18; H04W 88/06; H04W 4/029; H04L 69/14; H04L 67/14
USPC ........................................................ 370/331
See application file for complete search history.

(56) References Cited

U.S. PATENT DOCUMENTS

| | | | | |
|---|---|---|---|---|
| 9,843,763 | B2* | 12/2017 | Leabman | H04N 5/38 |
| 9,859,757 | B1* | 1/2018 | Leabman | H02J 50/80 |
| 10,368,255 | B2* | 7/2019 | Gunasekara | H04B 17/318 |
| 10,382,295 | B2* | 8/2019 | Barry | H04L 41/22 |
| 10,448,261 | B2* | 10/2019 | Sofuoglu | H04W 36/165 |
| 10,992,185 | B2* | 4/2021 | Leabman | A61B 8/56 |
| 10,992,187 | B2* | 4/2021 | Leabman | H04B 3/54 |
| 11,197,050 | B2* | 12/2021 | Gunasekara | H04N 21/2393 |
| 11,502,551 | B2* | 11/2022 | Leabman | H05B 3/342 |
| 2013/0267251 | A1* | 10/2013 | Khorashadi | H04W 4/023 455/456.3 |
| 2014/0266909 | A1 | 9/2014 | Palanki et al. | |
| 2014/0274043 | A1 | 9/2014 | Das et al. | |
| 2015/0264519 | A1 | 9/2015 | Mirzaei et al. | |
| 2015/0373503 | A1 | 12/2015 | Jovicic | |
| 2016/0174147 | A1 | 6/2016 | Chen et al. | |
| 2016/0187457 | A1 | 6/2016 | Chen et al. | |
| 2016/0192151 | A1 | 6/2016 | Marri Sridhar et al. | |
| 2016/0234635 | A1* | 8/2016 | Chen | H04W 4/33 |
| 2016/0255604 | A1* | 9/2016 | Venkatraman | G01S 5/02524 455/456.1 |
| 2017/0078851 | A1* | 3/2017 | Agrawal | G01S 5/02524 |
| 2018/0060476 | A1 | 3/2018 | Kasch et al. | |
| 2018/0125689 | A1* | 5/2018 | Perez | A61N 1/36014 |
| 2019/0037418 | A1* | 1/2019 | Gunasekara | H04W 24/02 |
| 2019/0230620 | A1* | 7/2019 | Ohlarik | H04W 24/10 |
| 2020/0100121 | A1 | 3/2020 | Cookman et al. | |
| 2020/0127907 | A1* | 4/2020 | Koo | H04W 24/04 |
| 2020/0229206 | A1* | 7/2020 | Badic | H04W 52/0209 |
| 2020/0322703 | A1* | 10/2020 | Bures | G06N 20/00 |
| 2021/0307137 | A1* | 9/2021 | Bhutani | H05B 45/20 |
| 2022/0167243 | A1 | 5/2022 | Gundavelli et al. | |

OTHER PUBLICATIONS

The International Preliminary Report on Patentability for PCT Application No. PCT/US21/60724, dated Mar. 14, 2022.
Thomas Valerrian Pasca Santhappan, "Traffic Steering in Radio Level Integration of LTE and WI-FI Networks", Indian Institute of Technology Hyderabad in Partial Fullfilment of the Requirements for the Degree of Doctor of Philosophy, 190 pages.

* cited by examiner

| LOCATION 304 | LATITUDE 306 | LONGITUDE 308 | ALTITUDE 308 | Wi-Fi RSSI 310 | Wi-Fi SNR 312 | 5G RSRP 314 | 5G RSPQ 316 | 5G SINR 318 |
|---|---|---|---|---|---|---|---|---|
| FLOOR 1 | 42.9 | 8.6 | 0 | -75 | 20 | -79 | -9 | 20 |
| FLOOR 1 | 43 | 8.6 | 0 | -72 | 18 | -77 | -9 | 20 |
| FLOOR 1 | 43.1 | 8.7 | 0 | -72 | 18 | -77 | -9 | 20 |
| FLOOR 1 | 43.2 | 8.7 | 0 | -65 | 25 | -89 | -16 | 16 |
| FLOOR 1 | 43.3 | 8.8 | 0 | -62 | 24 | -81 | -13 | 19 |

| MNO RSRP 320 | MNO RSQP 322 | MNO SINR 324 |
|---|---|---|
| -90 | -20 | 13 |
| -96 | -20 | 13 |
| -96 | -20 | 13 |
| -99 | -22 | 12 |
| -98 | -21 | 12 |

FIG. 3A

| AVG. TH. 328 | WI-FI P.D. 330 | WI-FI P.R. 332 | AVG. TH. 334 | 5G P.D. 336 | 5G P.R. 338 | AVG. TH. 340 |
|---|---|---|---|---|---|---|
| 30 MBPS | 5% | 10% | 100 MBPS | 2% | 5% | 10 MBPS |
| 30 MBPS | 5% | 10% | 80 MBPS | 1% | 1% | 20 MBPS |
| 13 MBPS | 5% | 10% | 83 MBPS | 1% | 1% | 20 MBPS |
| 173 MBPS | 1% | 5% | 83 MBPS | 5% | 4% | 20 MBPS |
| 173 MBPS | 2% | 3% | 99 MBPS | 5% | 8% | 20 MBPS |

FIG. 3B

| RECOMMENDATION 344 | TARGET N.D. 346 |
|---|---|
| 5G PRIVATE | CBSD-1 |
| 5G PRIVATE | CBSD-1 |
| 5G PRIVATE | CBSD-2 |
| WIFI | WiFi AP 1 |
| WIFI | WiFi AP 2 |

TECHNIQUES FOR SELECTING NETWORK PROTOCOLS

RELATED APPLICATIONS

This application claims priority to and is a continuation of U.S. patent application Ser. No. 17/105,266, filed on Nov. 25, 2020, the entire contents of which are incorporated herein by reference.

TECHNICAL FIELD

The present disclosure relates generally to selecting network protocols for communicating using an electronic device.

BACKGROUND

There are many instances in which a device switches between communicating using a first type of network, such as Wi-Fi, and a second type of network, such a cellular network. For example, the device may initially be communicating using the first type of network. The device may then detect an interruption with the first type of network, such as when the device loses the connection. In response, the device may begin to communicate using the second type of network. In many circumstances, it may be beneficial for the device to switch between the network connections even without detecting the interruption. For example, based on a location of the device, the second type of network may include a better quality connection, such as with faster throughput, than the first type of network. However, if the device has yet to detect an interruption with the first type of network, the device may continue to communicate using the first type of network instead of switching to the second type of network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

FIG. 3A illustrates a first example of heatmap data, in accordance with the present concepts.

FIG. 3B illustrates a second example of heatmap data, in accordance with the present concepts.

FIG. 3C illustrates a third example of heatmap data, in accordance with the present concepts.

DESCRIPTION OF EXAMPLE EMBODIMENTS

Overview

Figure 1:
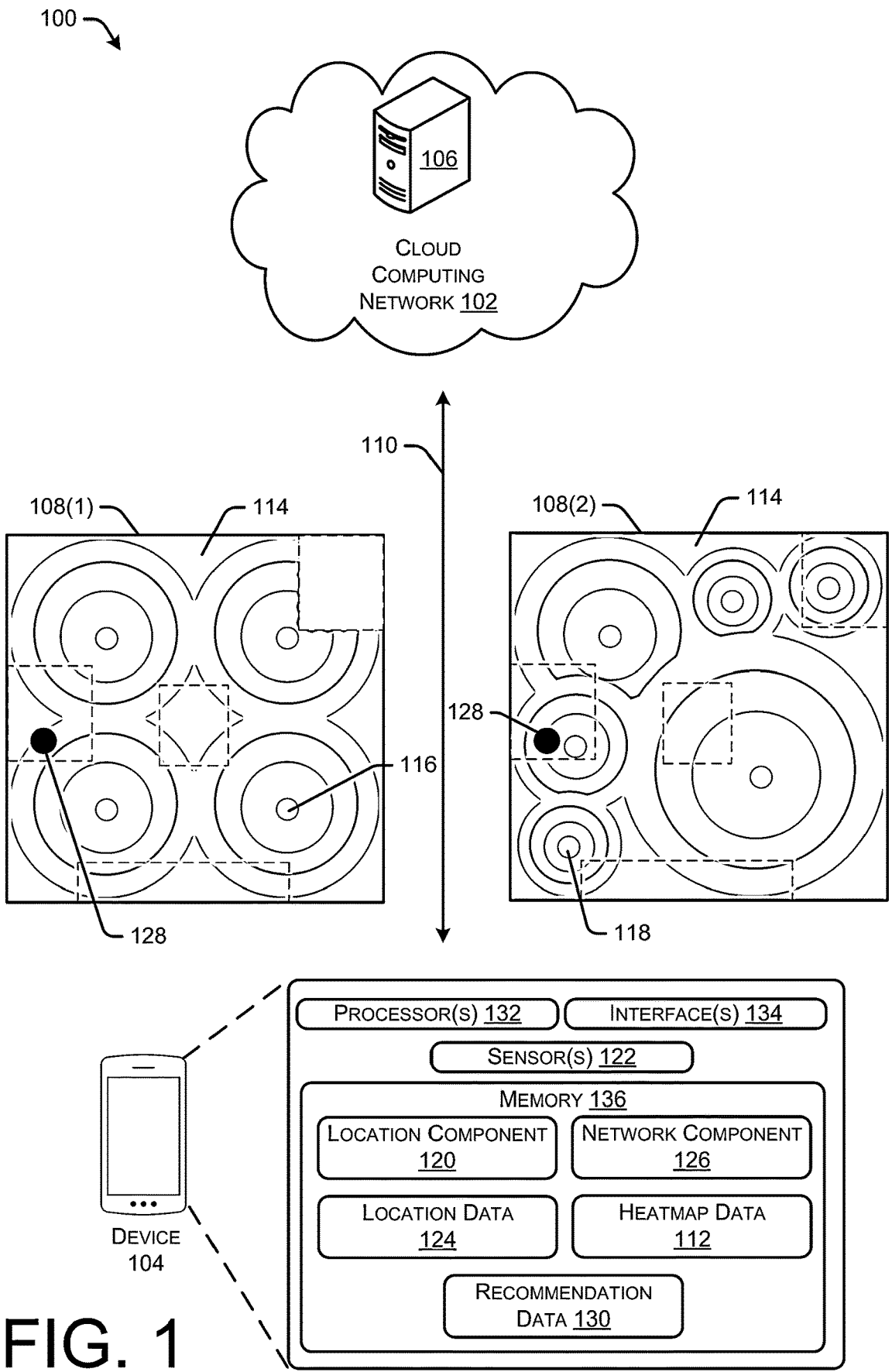
FIG. 1 illustrates a component diagram with an example environment in which techniques for selecting network protocols may be employed, in accordance with the present concepts.

This disclosure describes, at least in part, an electronic device configured to receive, from one or more devices, first heatmap data associated with a first network protocol and receive, from the one or more devices, second heatmap data associated with a second network protocol. The electronic device may also be configured to receive location data representing a location associated with the electronic device. Additionally, the electronic device may be configured to determine, based at least in part on the first heatmap data, the second heatmap data, and the location data, to communicate using the first network protocol and establish a connection using the first network protocol.

This disclosure also describes, at least in part, a method that includes receiving, from one or more devices, heatmap data representing at least a first characteristic associated with a first network protocol and a second characteristic associated with a second network protocol. The method also includes determining a location associated with an electronic device. Additionally, the method includes determining, based at least in part on the first characteristic, the second characteristic, and the location, that the electronic device should communicate using the first network protocol and establishing, by the electronic device, a connection using the first network protocol.

This disclosure also describes, at least in part, a system configured to generate first heatmap data associated with an environment, the first heatmap data representing a first network protocol, and generate second heatmap data associated with the environment, the second heatmap data representing a second network protocol. The system may also be configured to determine a location within the environment and determine, based at least in part on first heatmap data, the second heatmap data, and the location, to communicate using the first network protocol at the location. Additionally, the system is configured to send, to an electronic device, an indication of the first network protocol.

Example Embodiments

As discussed above, there are many instances in which a device switches between communicating using a first type of network, such as Wi-Fi, and a second type of network, such as a cellular network. For example, the device may initially be communicating using the first type of network. The device may then detect an interruption with the first type of network, such as when the device loses the connection. In response, the device may begin to communicate using the second type of network. In many circumstances, it may be beneficial for the device to switch between the network connections even without detecting the interruption. For example, based on a location of the device, the second type of network may include a better quality connection, such as with faster throughput, than the first type of network. However, if the device has yet to detect an interruption with the first type of network, the device may continue to communicate using the first type of network instead of switching to the second type of network.

As such, this disclosure describes, at least in part, techniques for selecting network protocols. For instance, system(s) may receive data from sources (e.g., user devices, sensors, network devices, etc.), where the data represents at least radio frequency (RF) information for different network protocols. For example, the RF information may be associated with a first network protocol, such as Wi-Fi, and a second network protocol, such as a cellular network protocol (e.g., 3G, 4G, 5G, etc.). The system(s) may then use the data to generate heatmaps for the network protocols. For example, the system(s) may generate a first heatmap representing the first network protocol and a second heatmap representing the second network protocol. The system(s) may then provide the heatmaps to a user device, such as at a time of initial network attachment with the user device and/or at a later time. Using the heatmaps, the user device is able to select between using the first network protocol or the second network protocol. For example, the user device may use the heatmaps to determine which network protocols provide the best quality connections at various locations. Based on the determinations, the user device may then establish connections using the network protocols.

For more details, the system(s) may initially receive the data from the sources, where the data represents the RF information. The sources may include, but are not limited to, user devices, network devices (e.g., access points), sensors, and/or any other device that is capable to measuring and/or reporting the RF information. The RF information may include measurements representing the radio characteristics detected and/or reported by the sources at various locations within an environment (e.g., a home, an apartment, a building, a business, etc.). The characteristics may include, but are not limited to, signal strengths (e.g., received signal strength indication (RSSI), reference signal received power (RSRP), reference signal received quality (RSRQ), etc.), signal to noise ratios (SNRs), throughputs, data packet drop rates, data packet retry rates, and/or any other network characteristics. The system(s) may then use the data to generate heatmaps for the different network protocols.

For example, the system(s) may generate a first heatmap associated with the first network protocol (also referred to as a "first type of network"), such as the Wi-Fi protocol, and a second heatmap for the second network protocol (also referred to as a "second type of network"), such as the cellular network protocol (e.g., 5G protocol). In some examples, the heatmaps represent the signal strengths at various locations within the environment. For example, the first heatmap may represent the average signal strengths at the various locations within the environment for the first network protocol and the second heatmap may represent the average signal strengths at the various locations within the environment for the second network protocol. Additionally, or alternatively, in some examples, the heatmaps represent other characteristics (e.g., the throughputs, the data packet drop rates, the data packet retry rates, etc.)) at the various locations within the environment. For example, the first heatmap may represent the average throughput at the various locations within the environment for the first network protocol and the second heatmap may represent the average throughout at the various locations within the environment for the second network protocol.

In some instances, the system(s) may generate the heatmaps for a specific environment. For example, the system(s) may generate the heatmaps for a home, an apartment, a building, a business, and/or any other type of environment. In some instances, the system(s) may generate different heatmaps for different areas of the environment. For a first example, the system(s) may generate respective heatmaps for each floor of the environment. For a second examples, the system(s) may generate respective heatmaps for each room of the environment. In some instances, the system(s) may then use the heatmaps to determine recommendations associated with the network protocols.

For instance, the system(s) may use the heatmaps to determine which network protocols to use at various locations within the environment. For example, the system(s) may determine that the user devices should use the first network protocol at first location(s) within the environment and the second network protocol at second location(s) within the environment. In some instances, the system(s) make the recommendations based on one or more of the characteristics. For a first example, the system(s) may recommend the network protocols that provide the highest signal strengths at the various locations within the environment. For a second example, the system(s) may recommend the network protocols that provide the fastest throughputs at the various locations within the environment. Still, for a third example, the system(s) may recommend the network protocols that provide the lowest data packet drop rates at the various locations within the environment.

In some instances, the system(s) may also use the heatmaps to determine which network devices (e.g., access points) to connect to at various locations within the environment. For example, the system(s) may determine that the user devices should connect to a first network device at first location(s) within the environment, a second network device at second location(s) within the environment, a third network device at third location(s) within the environment, and/or so forth. In some instances, the system(s) make the recommendations based on one or more of the characteristics. For a first example, the system(s) may recommend the network devices that provide the highest signal strengths at the various locations within the environment. For a second example, the system(s) may recommend the network devices that provide the fastest throughputs at the various locations within the environment. Still, for a third example, the system(s) may recommend the network devices that provide the lowest data packet drop rate at the various locations within the environment.

In some examples, the system(s) may determine one or more of the recommendations for different types of devices. For a first example, the system(s) may use the heatmap data to recommend the first network protocol for a first type of user device and recommend the second network protocol for a second, different type of user device. For a second example, the system(s) may use the heatmap data to recommend a first network device for a first type of user device and recommend a second, different network device for a second, different type of user device. In such examples, the system(s) may make the recommendations even when the user devices are located at the same location. As described herein, types of user devices may include, but are not limited to, computers, laptops, mobile devices, tablets, robots, and/or any other type of device.

The user devices may then use heatmap data representing the heatmaps to select network protocols while within the environment. For instance, a user device may receive the heatmap data, such as when the user device enters the environment. In some instances, the system(s) may send the heatmap data to the user device. For example, the system(s) may send the user device an Extensible Markup Language (XML) content file, a JavaScript Object Notation (JSON) content file, and/or any other type of content file that includes the heatmap data. Additionally, or alternatively, in some instances, the system(s) may send the user device an identifier, such as a Uniform Resource Identifier (URI), associated with downloading the heatmaps. The user device may then display an indication of the identifier. While displaying the indication of the identifier, the user device may receive an input selecting the identifier from a user. In response, the user device may use the identifier to download the heatmap data from one or more devices (e.g., from the system(s), from one or more other system(s), etc.).

The user device may then use the heatmap data to select network protocols while within the environment. In some instances, the user device selects the network protocols based on the locations associated with the user device within the environment. For a first example, the user device may analyze the heatmap data in order to determine which network protocol provides the highest signal strength at the location of the user device and select that network protocol. For a second example, the user device may analyze the heatmap data in order to determine which network protocol provides the faster throughputs at the location of the user device and select that network protocol. Still, for a third example, the user device may analyze the heatmap data in order to determine which network protocol provides the lowest data packet drop rate at the location of the user device and select that network protocol. While these are just a couple example techniques of the user device using the heatmap data to select a network protocol, in other examples, the user device may use one or more additional and/or alternative techniques for selecting network protocols.

In some examples, the user device may select the network protocols and/or the network devices based on the type of user device that is associated with the user device. For example, a first type of user device may use the heatmap data to select the first network protocol while a second type of user device may use the heatmap data to select the second network protocol. This may be because the first type of user device selects the network protocol that is most beneficial for the first type of user device, such as providing the best RSSI, while the second type of user device selects the network protocol that is most beneficial for the second type of user device, such as providing the fastest throughput. In such examples, the user devices may receive heatmap data that corresponds to the types of user device. For example, the system(s) may receive data from a user device and use the data to determine that the user device includes a type of user device. The system(s) may then use that determination to send, to the user device, heatmap data that is generated for that type of user device.

In some instances, the user device may use one or more sensors to determine the locations of the user device while within the environment. For example, the user device may receive location data from a Global Positioning System (GPS) sensor, where the location data represents the locations of the user device while within the environment. Additionally, or alternatively, in some instances, the user device may receive, from the system(s), location data representing the locations of the user device while within the environment. For example, the system(s) may receive from the user device and use the data to determine the locations of the user device (e.g., such as by using triangulation to determine the locations). The user device may then receive the location data from the system(s).

In some instances, the system(s) may update the heatmaps while the user device is within the environment. For example, the system(s) may continue to receive the data representing the RF information from the sources and update the heatmaps using the new RF information. In some instances, the system(s) may also update the recommendations based on the updated heatmaps. The system(s) may then send, to the user device, additional heatmap data representing the updated heatmaps. This way, the user device is able to use the updated heatmaps, which represent current characteristics of the network protocols within the environment, to select between the network protocols while within the environment.

In some instances, the user device (and/or the system(s)) may select network protocols for future periods of time while the user device is within the environment. For example, the user device (and/or the system(s)) may determine a current location of the user device, a direction at which the user device is moving, and a future location of the user device based on the current location and the direction of movement. The user device (and/or the system(s)) may then determine, using one or more of the processes described above, that the user device should communicate using a specific network protocol at that future location. As such, if the user device is currently communicating using the network protocol, then the user device may continue to communicate using the network protocol. However, if the user device is currently using a different network protocol, then the user device may switch to communicating using the network protocol. In some examples, the user device performs the switch when the user device is located at the future location. In other examples, the user device performs the switch before being located at the future location. This way, the user device is already using the best quality network protocol when arriving at the future location.

By performing the processes described herein, the user devices are able to better select network protocols for communicating while within an environment. For example, instead of measuring characteristics associated with each network protocol at a location within the environment and then selecting a network protocol based on the characteristics, a user device is provided with global characteristics for the entire environment. The user device is then able to select network protocols based on the global characteristics as well as select network protocols for future locations at which the user device will be located while moving throughout the environment.

Although the examples described herein may refer to an electronic device and/or system(s) as participating in the techniques for selecting network protocols, the techniques can generally be applied to any device or role, including an enterprise workforce scenario. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The user devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved. Additionally, by improving the communication across the network, user experiences are also improved since the user are provided with the best quality network connections.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 in accordance with the present network protocol selecting concepts. The example environment 100 may include a cloud computing network 102 (e.g., network), a user device 104, and one or more electronic devices 106. Parentheticals are utilized after a reference number to distinguish like elements. Use of the reference number without the associated parenthetical is generic to the element. For example, FIG. 1 includes two instances heatmaps 108(1)-(2) (which may also be referred to as just "heatmaps 108").

In some examples, the environment 100 comprises a data center or cloud-computing network comprising servers and other network components (e.g., routers, switches, etc.) stored across multiple data centers located across geographic areas. In these instances, the cloud-computing environment may be a distributed network through which devices interact with service provided by the cloud computing network. The cloud computing network may provide on-demand availability of computing system resources, such as data storage, computing power (e.g., CPU, GPU, etc.), networking, databases, etc., without direct active management by users. In some examples, the cloud computing network may be managed and maintained by a service provider such that users do not have to invest in and maintain the computing infrastructure for their computing resource needs.

The user device 104 and/or electronic device(s) 106 may be communicatively coupled among one another and/or to various other devices via cloud computing network 102. Within the example environment 100, the user device 104, the electronic device(s) 106, and/or other devices may exchange communications (e.g., packets) via a network connection(s) to cloud computing network 102, indicated by double arrow 110. For instance, network connections 110 may be transport control protocol (TCP) network connections or any network connection (e.g., information-centric networking (ICN)) that enable the devices to exchange packets with other devices via cloud computing network 102. The network connections 110 represent, for example, a data path between the user device 104 and the electronic device(s) 106. For example, the user device 104 may be a computer, laptop, mobile device, tablet, etc., while the electronic device(s) 106 may be configured to provide data and/or network services to the user device 104. The electronic device(s) 106 may or may not be a producer, a point of generation and/or origination of the data. For instance, the data may originate elsewhere for the electronic device(s) 106 to be able to provide to the user device 104. Additionally, or alternatively, the data may pass through other network devices (e.g., router, switch) on a path from the electronic device(s) 106 to the user device 104. It should be appreciated that the term "network connection" may also be referred to as a "network path." The use of a cloud computing network in this example is not meant to be limiting. Other types of networks are contemplated in accordance with multi-party cloud authentication concepts.

In the example of FIG. 1, the electronic device(s) 106 may send heatmap data 112 representing the first heatmap 108(1) and the second heatmap 108(2) to the user device 104. The first heatmap 108(1) may be associated with a first network protocol and the second heatmap 108(2) may be associated with a second network protocol. For example, the first heatmap 108(1) may be associated with a Wi-Fi protocol and the second heatmap 108(2) may be associated with a cellular network protocol, such as 5G. However, in other examples, the first heatmap 108(1) and/or the second heatmap 108(2) may be associated with any other type of network protocol. While the example of FIG. 1 illustrates the heatmap data 112 as representing actual heatmaps 108, in other examples, the heatmap data 112 may represent characteristics associated with RF information (which is illustrated in the examples of FIGS. 3A-3B).

As shown, the heatmaps 108 represent an environment 114 (e.g., a home, an apartment, a building, a business, etc.) and/or portion (e.g., floor, room, etc.) of the environment 114 for which the user device 104 is located. For instance, and in the example of FIG. 1, the heatmaps 108 may represent a floor of a building for which the user device 104 is located, where the floor includes various rooms that are represented by the dashed lines. As shown, the first heatmap 108(1) includes locations of various network devices 116 (although only one is labeled for clarity reasons) associated with the first network protocol, such as access points, within the environment 114. Additionally, the second heatmap 108(2) includes locations of various network device 118 (although only one is labeled for clarify reasons) associated with the second network protocol, such as Citizens Broadband Radio Service Devices (CBSDs), within the environment 114. The heatmaps 108 also illustrate characteristics associated with the network protocols at various locations within the environment 114.

For a first example, the heatmaps 108 may illustrate the signal strengths (e.g., average signal strengths) for the different network protocols at various locations within the environment 114. In such an example, the lighter portions of the heatmaps 108 may indicate no or low signal strengths while the darker portions of the heatmaps 108 may indicate high signal strengths. For a second examples, the heatmaps 108 may illustrate the throughputs for the different network protocols at various locations within the environment 114. In such an example, the lighter portions of the heatmaps 108 may indicate no or low throughputs while the darker portions of the heatmaps 108 may indicate high throughputs. Still, for a third example, the heatmaps 108 may illustrate data packet loss rates at various locations within the environment 114. In such an example, the lighter portions of the heatmaps 108 may indicate high data packet loss rates while the darker portions may indicate no or low levels of data packet loss rates. While these are just a couple of examples of characteristics that the heatmaps 108 may represent, in other examples, the heatmaps may represent additional and/or alternative characteristics.

In some instances, the electronic device(s) 106 may send the heatmap data 112 to the user device 104. For example, the electronic device(s) 106 may send the user device 104 an XML content file, a JSON content file, and/or any other type of content file that includes the heatmap data 112. Additionally, or alternatively, in some instances, the electronic device(s) 106 may send the user device 104 an identifier, such as a URI, associated with downloading the heatmaps 108. Based on receiving the identifier, the user device 104 may then display an indication of the identifier. While displaying the identifier, the user device 104 may receive an input selecting the identifier from a user. In response, the user device 104 may use the identifier to download the heatmap data 112 from one or more devices (e.g., from the electronic device(s) 106, from one or more system(s), etc.).

The user device 104 may use the heatmap data 112 to select between the first network protocol and the second network protocol. For instance, the user device 104 may include a location component 120 that determines a location associated with the user device 104 within the environment 114. In some examples, the user device 104 determines the location using sensor(s) 122. For example, the sensors 122 may include a location sensor, such as a GPS sensor, that generates location data 124 representing the location within the environment 114. Additionally, or alternatively, in some examples, the user device 104 may receive, from the electronic device(s) 106, location data 124 representing the location. In such examples, the electronic device(s) 106 may determine the location of the user device 104 using one or more techniques, such as triangulation.

A network component 126 of the user device 104 may then use the heatmap data 112 along with the location data 124 to select the network protocols. For a first example, the network component 126 may analyze the heatmap data 112 in order to determine which network protocol provides the highest signal strength at the location of the user device 104 and select that network protocol. For a second example, the network component 126 may analyze the heatmap data 112 in order to determine which network protocol provides the faster throughputs at the location of the user device 104 and select that network protocol. Still, for a third example, the network component 126 may analyze the heatmap data 112 in order to determine which network protocol provides the lowest data packet drop rate at the location of the user device 104 and select that network protocol. While these are just a couple example techniques of the network component 126 using the heatmap data 112 to select a network protocol, in other examples, the network component 126 may use one or more additional and/or alternative techniques for selecting network protocols.

For an example of selecting a network protocol, the network component 126 may analyze the location data 124 and, based on the analysis, determine that the user device 104 is located at a location within the environment 114, which is represented by indicators 128. The network component 126 may then analyze the heatmap data 112 representing the first heatmap 108(1) and, based on the analysis, determine that there is low signal strength associated with the first network protocol at the location. Additionally, the network component 126 may analyze the heatmap data 112 representing the second heatmap 108(2) and, based on the analysis, determine that there is high signal strength associated with the second network protocol at the location. As such, the network component 126 may determine that the user device 104 should communicate using the second network protocol. In response, the user device 104 may continue to communicate using the second network protocol if the user device 104 is already communicating using the second network protocol or the user device 104 may establishing a connection using the second network protocol if the user device 104 is not already communicating using the second network protocol.

As discussed above, in some examples, the electronic device(s) 106 may provide the user device 104 with recommendations for selecting network protocols. The recommendations may indicate the type of network protocol, the network device for establishing the connection, and/or the like. In some examples, the heatmap data 112 may include the recommendations. For example, the electronic device(s) 106 may determine the recommended network protocol and/or the recommend network device at the various locations within the environment 114 and/or based on the type of the user device 104. The electronic device(s) 106 may then generate the heatmap data 112 to include these recommendations. Additionally, or alternatively, in some examples, the electronic device(s) 106 may use similar processes as the user device 104 to determine the recommended network protocol and/or the recommended network device based on the current location of the user device 104 and/or the type of the user device 104. The electronic device(s) 106 may then send, to the user device 104, recommendation data 130 representing the recommendations.

In some instances, the electronic device(s) 106 may continue to receive data representing RF information and update the heatmaps 108 based on the new RF information. If the electronic device(s) 106 update the heatmaps 108 while the user device 104 is located within the environment 114, then the electronic device(s) 106 may send, to the user device 104, additional heatmap data 112 represented the updated heatmaps 108. This way, the user device 104 uses the most updated heatmap data 112 to select the network protocols while within the environment 114.

As further illustrated in the example of FIG. 1, the user device 104 includes processor(s) 132, network interface(s) 134, and memory 136 As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Figure 2:
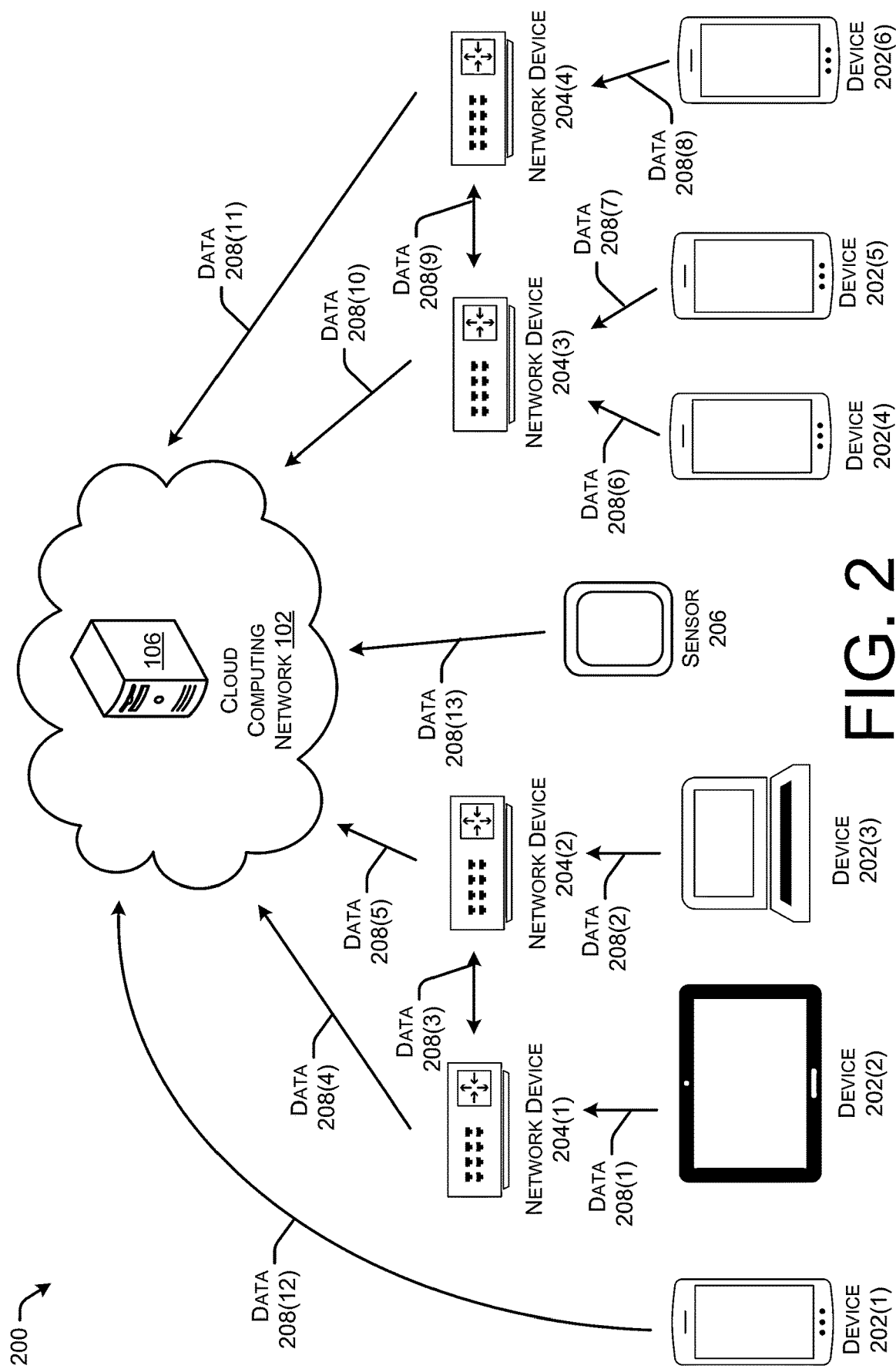
FIG. 2 illustrates a component diagram with an example environment in which techniques for generating heatmaps may be employed, in accordance with the present concepts.

FIG. 2 illustrates a component diagram with an example environment in which techniques for generating the heatmaps 108 may be employed, in accordance with the present concepts. The example environment 200 may include the cloud computing network 102 (e.g., network), the electronic device(s) 106, user devices 202(1)-(6) (also referred to as "user devices 202"), network devices 204(1)-(4) (also referred to as "network devices 204"), and a sensor 206. Parentheticals are utilized after a reference number to distinguish like elements. Use of the reference number without the associated parenthetical is generic to the element. For example, FIG. 2 includes six instances of user devices 202 and four instances of network devices 204.

The network devices 204 may include, but are not limited to, access points, CBSDs, and/or any other device that is capable of receiving and sending data. In some instances, the network devices 204(1)-(2) are associated with a first network protocol, such as a Wi-Fi protocol, and the network devices 204(3)-(4) are associated with a second network protocol, such as a cellular network protocol (e.g., 5G). For example, the first network device 204(1) may receive, from the second user device 202(2), first data 208(1) representing RF information measured by the second user device 202(2). Additionally, the second network device 204(2) may receive, from the third user device 202(3), second data 208(2) representing RF information measured by the third user device 202(3). In some instances, the first network device 204(1) and the second network device 204(2) may send third data 208(3) representing RF information between one another. The first network device 204(1) may then send, to the electronic device(s) 106, fourth data 208(4) representing collected RF information from user devices 202 while the second network device 204(2) may send, to the electronic device(s) 106, fifth data 208(5) representing collected RF information from the user devices 202.

For another example, the third network device 204(3) may receive, from the fourth user device 202(4) and the fifth user device 202(5), sixth data 208(6) representing RF information measured by the fourth user device 202(4) and seventh data 208(7) representing RF information measured by the fifth user device 202(5), respectively. Additionally, the fourth network device 204(4) may receive, from the sixth user device 202(6), eighth data 208(8) representing RF information measured by the sixth user device 202(6). In some instances, the third network device 204(3) and the fourth network device 204(4) may send ninth data 208(9) representing RF information between one another. The third network device 204(3) may then send, to the electronic device(s) 106, tenth data 208(10) representing collected RF information from user devices 202 while the fourth network device 204(4) may send, to the electronic device(s) 106, eleventh data 208(11) representing collected RF information from the user devices 202.

As further illustrated in the example of FIG. 2, the first user device 202(1) may send, to the electronic device(s) 106, twelfth data 208(12) representing RF information measured by the first user device 202(1). In some instances, the first user device 202(1) sends the twelfth data 208(12) to the electronic device(s) 106 via a cellular network provider. Furthermore, the sensor 206 may measure RF information within the environment 114. The RF information may be associated with the first network protocol and/or the second network protocol. The sensor 206 may then send, to the electronic device(s) 106, thirteenth data 208(13) representing the RF information.

In the example of FIG. 2, in addition to the data 208(1)-(13) (also referred to as "data 208") representing the RF information, the data 208 may represent the locations of the user devices 202 that are measuring the RF information. For example, the first user device 202(1) may be sending both the data 208(12) representing the RF information measured by the first user device 202(1) as the first user device 202(1) is moving throughout the environment as well as data 208(12) representing the locations (e.g., the geolocations) of the first user device 202(1).

The electronic device(s) 106 may then use the data 208 to generate the heatmaps 108. For example, the electronic device(s) 106 may analyze the data 208 to determine the RF information for various locations within the environment 114. As discussed above, the RF information may include measurements representing the radio characteristics detected and/or reported by the user devices 202 and/or the sensor 206. The characteristics may include, but are not limited to, signal strengths (e.g., RSSI, RSRP, RSRQ, etc.), SNRs, throughputs, data packet drop rates, data packet retry rates, and/or any other network characteristics. The electronic device(s) 106 may then generate the heatmaps 108 based on the analysis.

For example, and with regard to the first network protocol, the electronic device(s) 106 may determine the average of the characteristics at various locations within the environment 114. The electronic device(s) 106 may then generate the first heatmap 108(1) associated with the first network protocol to represent the average of the characteristics. For example, if the first heatmap 108(1) is associated with signal strengths within the environment 114, then the first heatmap 108(1) may represent the average signal strengths at the various locations within the environment 114. The electronic device(s) 106 may perform similar processes for generating the second heatmap 108(2) associated with the second network protocol. Additionally, and as discussed above, the electronic device(s) 106 may continue to receive new data 208 from the devices 202 and/or the sensor 206. The electronic device(s) 106 may then use the new data 208 to update the heatmaps 108.

Although the example of FIG. 2 illustrates six user devices 202, fourth network devices 204, and one sensor 108, in other examples, there may be any number of user devices, network devices, and/or sensors sending data to the electronic device(s) 106. Additionally, although the example above describes generating the heatmaps 108 to represent the average of the characteristics, in other example, the heatmaps 108 may represent the minimum of the characteristics, the median of the characteristics, the maximum of the characteristics, and/or the like.

FIG. 3A illustrates an example of first heatmap data 302 (which may include, and/or represent, the heatmap data 112), in accordance with the present concepts. As shown, the first heatmap data 302 may represent location information, such as a location 304, a latitude 306, a longitude 308, and an altitude 310. The location 204 may indicate the area of the environment 114. The area may include, but is not limited to, the floor, the room, and/or the like. The latitude 306, the longitude 308, and the altitude 310 may represent coordinates within the environment 114. In some instances, the coordinates are associated with the location 304. For example, the coordinates may be associated with various locations on the floor of the environment 114. In other instances, the coordinates are global. For example, the coordinates may be associated with GPS coordinates.

The first heatmap data 302 may further represent RF information associated with network protocols. For instance, and in the example of FIG. 3A, the first heatmap data 302 may represent a Wi-Fi RSSI 310 and a Wi-Fi SNR 312 at the various locations within the environment 114. The first heatmap data 302 may further represent a 5G RSRP 314, a 5G RSPQ 316, and a 5G SINR 318 at the various locations within the environment 114. Moreover, the first heatmap data 302 may represent a mobile network operator (MNO) RSRP 320, a MNO RSQP 322, and a MNO SINR 324 at the various locations within the environment 114. While the first heatmap data 302 in the example of FIG. 3A represents network protocols that include Wi-Fi, 5G, and MNO, in other examples, the first heatmap data 302 may represent additional and/or alternative network protocols.

FIG. 3B illustrates an example of second heatmap data 326, in accordance with the present concepts. In some examples, the second heatmap data 326 is sent with and/or included within the first heatmap data 302. In other examples, the second heatmap data 326 is separate from the first heatmap data 302. As shown, the second heatmap data 326 may represent additional RF information associated with the network protocols. For instance, and in the example of FIG. 3B, the second heatmap data 326 may represent an average throughput 328 associated with the Wi-Fi protocol, a Wi-Fi data packet drop rate 330, and a Wi-Fi data packet retry rate 332. The second heatmap data 326 may further represent an average throughput 334 associated with 5G, a 5G data packet drop rate 336, and a 5G data packet retry rate 338. Moreover, the second heatmap data 326 may represent the average throughput 340 associated with the MNO.

FIG. 3C illustrates an example of third heatmap data 342, in accordance with the present concepts. In some examples, the third heatmap data 342 is sent with and/or included within the first heatmap data 302 and/or the second heatmap data 326. In other examples, the third heatmap data 342 is separate from the first heatmap data 302 and/or the second heatmap data 326. As such, the third heatmap data 342 may represent a recommendation 344 for network protocols at the various locations within the environment 114. The third heatmap data 342 may further represent a target network device 346 for establishing a network connection. While these are just a couple of examples of recommendations that may be provided by the electronic device(s) 106, in other examples, the electronic device(s) 106 may provide additional and/or alternative recommendations.

Figure 4:
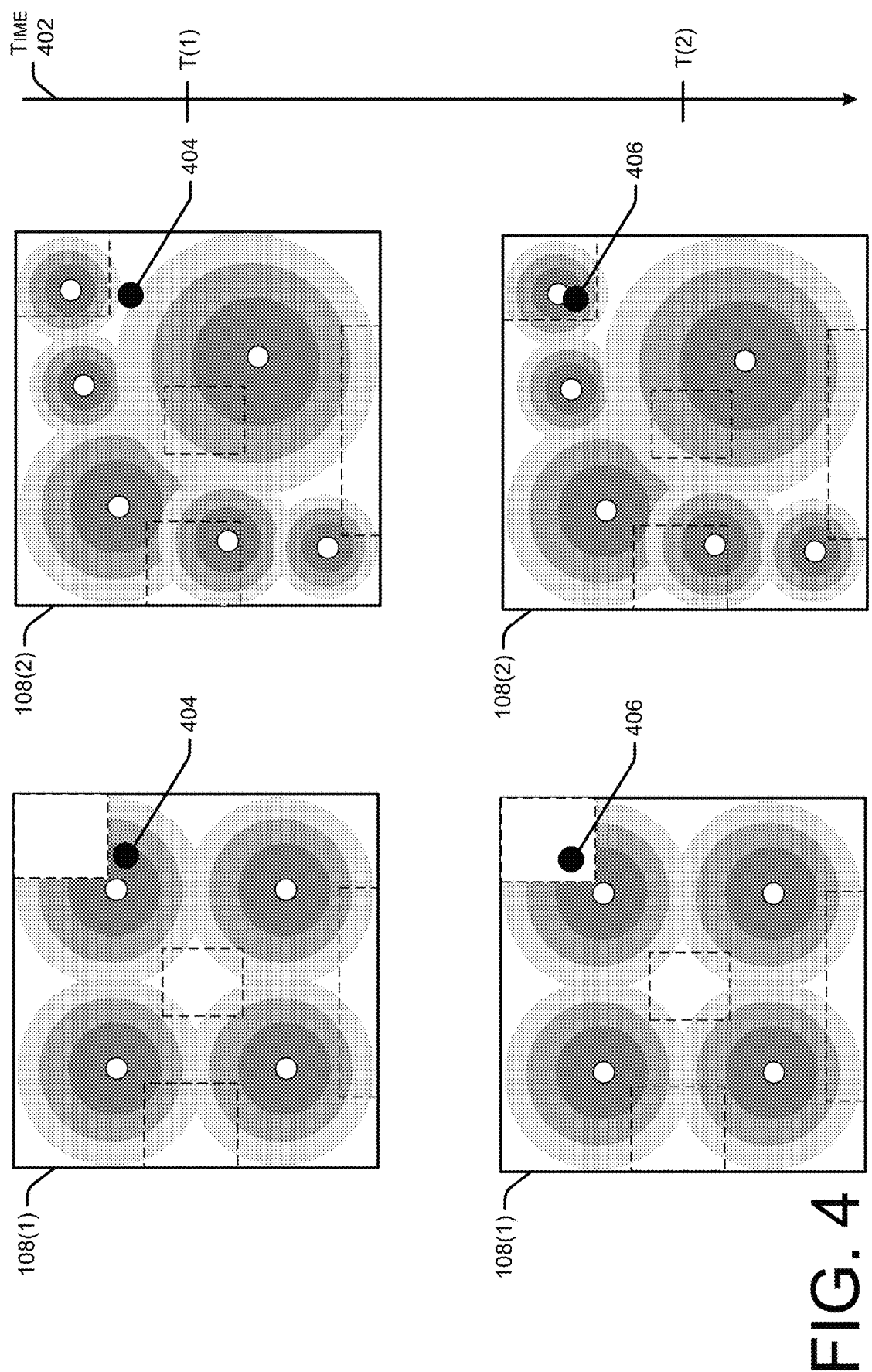
FIG. 4 illustrates an example of selecting network protocols while a user device is moving within an environment, in accordance with the present concepts.

FIG. 4 illustrates an example of selecting network protocols while the user device 104 is moving within the environment 114, in accordance with the present concepts. For example, the user device 104 may receive the heatmap data 112 representing characteristics associated with the first heatmap 108(1) and the second heatmap 108(2). The user device 104 may then use the heatmap data 112 to select between network protocols over a period of time 402 for which the user device 104 is located within the environment 114. For example, at a first time T(1), the user device 104 may determine that the user device 104 is located at a first location within the environment 114, which is represented by the circles 404. Based on being located at the first location, the user device 104 may select the first network protocol represented by the first heatmap 108(1). This may be because the first network protocol provides the highest signal strength, the highest throughput, the lowest data packet drop rate, and/or the highest data packet retry rate at the first location.

In the example of FIG. 4, the user device 104 may then determine a direction at which the user device 104 is moving. The user device 104 may then use the first location and the direction to determine that the user device 104 will be located at a second location within the environment 114 at a second, future time T(2), which is represented by circles 406. Based on being located at the second location at the second, future time, the user device 104 may select the second network protocol represented by the second heatmap 108(1). This may be because the second network protocol provides the highest signal strength, the highest throughput, the lowest data packet drop rate, and/or the highest data packet retry rate at the second location.

In some examples, the user device 104 may switch to communicating using the second network protocol before arriving at the second location at the second time. This way, the user device 104 will continue to have the best quality connection while moving throughout the environment 114. In other examples, the user device 104 may switch to communicating using the second network protocol when arriving at the second location at the second time. Additionally, although the example of FIG. 4 describes the user device 104 as selecting between the network protocols, in other examples, the electronic device(s) 106 may perform similar processes as the user device 104 and send recommendations to the user device 104.

Figure 5:
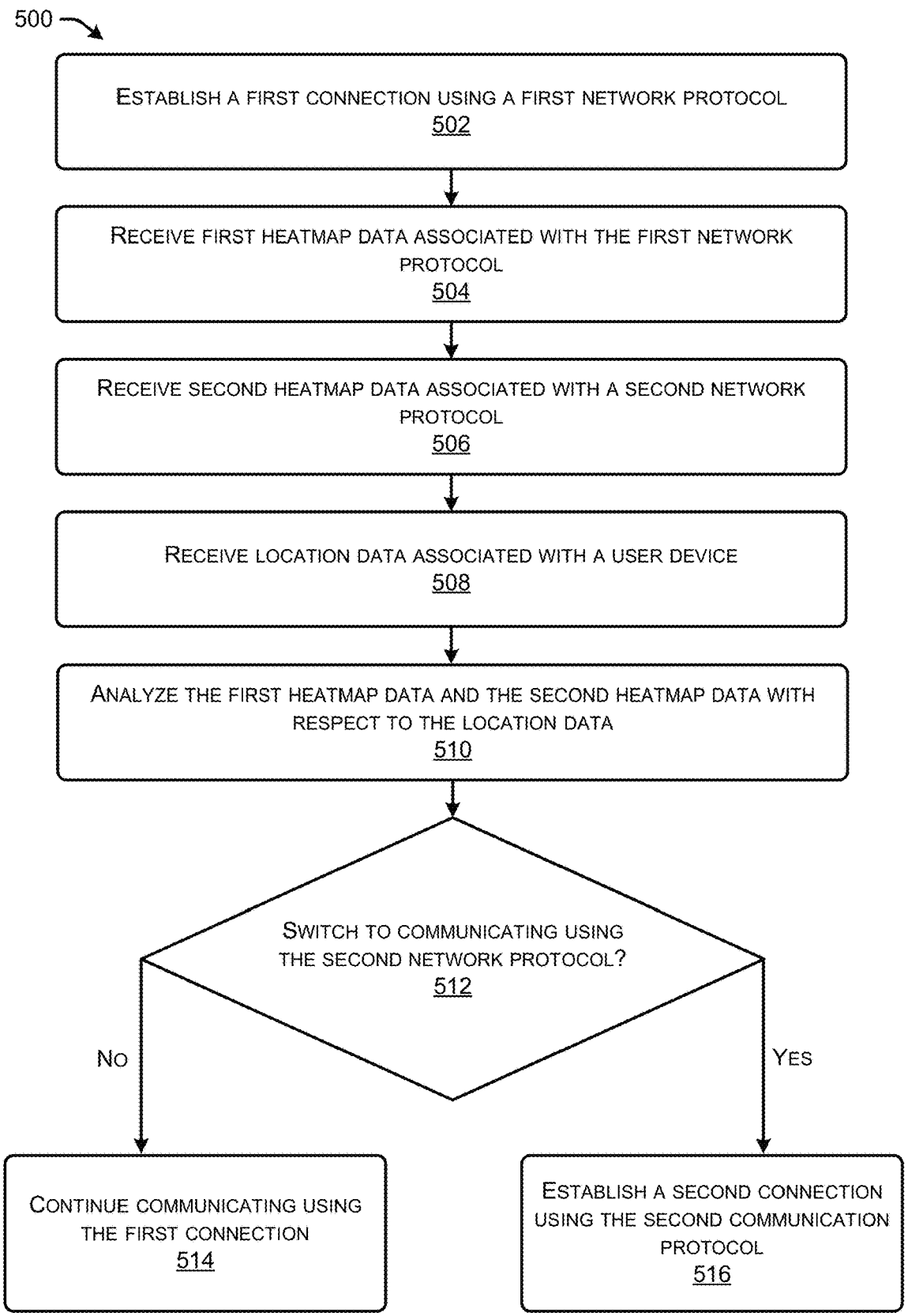
FIG. 5 illustrates a flow diagram of an example method for using heatmaps to select network protocols, in accordance with the present concepts.

FIG. 5 illustrates a flow diagram of an example method 500 for using heatmaps to select network protocols, in accordance with the present concepts. An operation 502 represents establishing a first connection using a first network protocol. For instance, the user device 104 may enter an environment. While within the environment, the user device 104 may establish the first connection using the first network protocol (e.g., a first type of network). In some examples, the first network protocol may include a Wi-Fi protocol, a cellular network protocol, and/or any other type of protocol.

An operation 504 represents receiving first heatmap data associated with the first network protocol and an operation 506 represents receiving second heatmap data associated with a second network protocol. For instance, the user device 104 may receive, from the electronic device(s) 106, the first heatmap data and the second heatmap data (which in some examples, may be included in a content file). In some examples, the user device 104 receives the first heatmap data and/or the second heatmap data based on entering the environment and/or establishing the first connection. For example, the user device 104 may receive the first heatmap data and/or the second heatmap data based on the connected with a specific network device (e.g., a network device that is associated with a lobby of a building). In some examples, the user device 104 initially receives an identifier, such as a URI, from the electronic device(s) 106. The user device 104 may then use the identifier to download the first heatmap data and/or the second heatmap data.

An operation 508 represents receiving location data associated with a user device. For instance, the user device 104 may receive the location data, where the location data represents a location of the user device 104 within the environment. In some instances, the user device 104 receives the location data by generating the location data using one or more sensors. In some examples, the user device 104 receives the location data from the electronic device(s) 106.

An operation 510 represents analyzing the first heatmap data and the second heatmap data with respect to the location data. For instance, the user device 104 may analyze the first heatmap data and the second heatmap data with respect to the location data. In some examples, the analyzing may include determining, using the first heatmap data, first characteristic(s) associated with first network protocol at the location and determining, using the second heatmap data, second characteristic(s) associated with the second network protocol at the location. The user device 104 may then compare the first characteristic(s) to the second characteristic(s). For a first example, the user device 104 may compare the signal strength associated with the first network protocol to the signal strength associated with the second network protocol. For a second example, the user device 104 may compare the throughput associated with the first network protocol to the throughput associated with the second network protocol.

In some instances, the user device 104 may further determine a type of device associated with the user device 104 and/or one or more requirements associated with one or more applications being executed by the user device 104. The user device 104 may then further analyze the first heatmap data and/or the second heatmap data with respect to the type of device and/or the one or more requirements.

An operation 512 represents determining whether to switch to communicating using the second network protocol. For instance, the user device 104 may determine whether to switch to communicating using the second network protocol based on the analyzing. In some instances, the user device 104 may determine to switch based on the first characteristic(s) and the second characteristic(s) indicating a better quality connection using the second network protocol. For a first example, the user device 104 may determine to switch when the second network protocol is associated with a higher signal strength than the first network protocol. For a second example, the user device 104 may determine to switch when the second network protocol is associated with a greater throughput than the first network protocol. Still, for a third example, the user device 104 may determine to switch when the second network protocol is associated with a smaller data packet drop rate than the first network protocol.

If, at operation 512, it is determined not to switch to communicating using the second network protocol, then operation 514 represents continuing to communicate using the first connection. For instance, if the user device 104 determines not to switch to communicating using the second network protocol, then the user device 104 may continue to communicate using the first connection. However, if, at operation 512, it is determined to switch to communicating using the second network protocol, then operation 516 represents establishing a second connection using the second network protocol. For instance, if the user device 104 determines to switch to communicating using the second network protocol, then the user device 104 may establish the second connection using the second network protocol.

It should be noted that, in some examples, the method may repeat starting back at operation 504, operation 506, and/or operation 508. For instance, the user device 104 may continue to receive updated heatmap data, continue to receive location data representing new locations of the user device 104, and continue to select network protocols using the new heatmap data and the new location data. It should also be noted that, in some examples, the electronic device(s) 106 may perform one or more of operations 504-512. In such examples, the electronic device(s) 106 may send recommendations to the user device 104.

Figure 6:
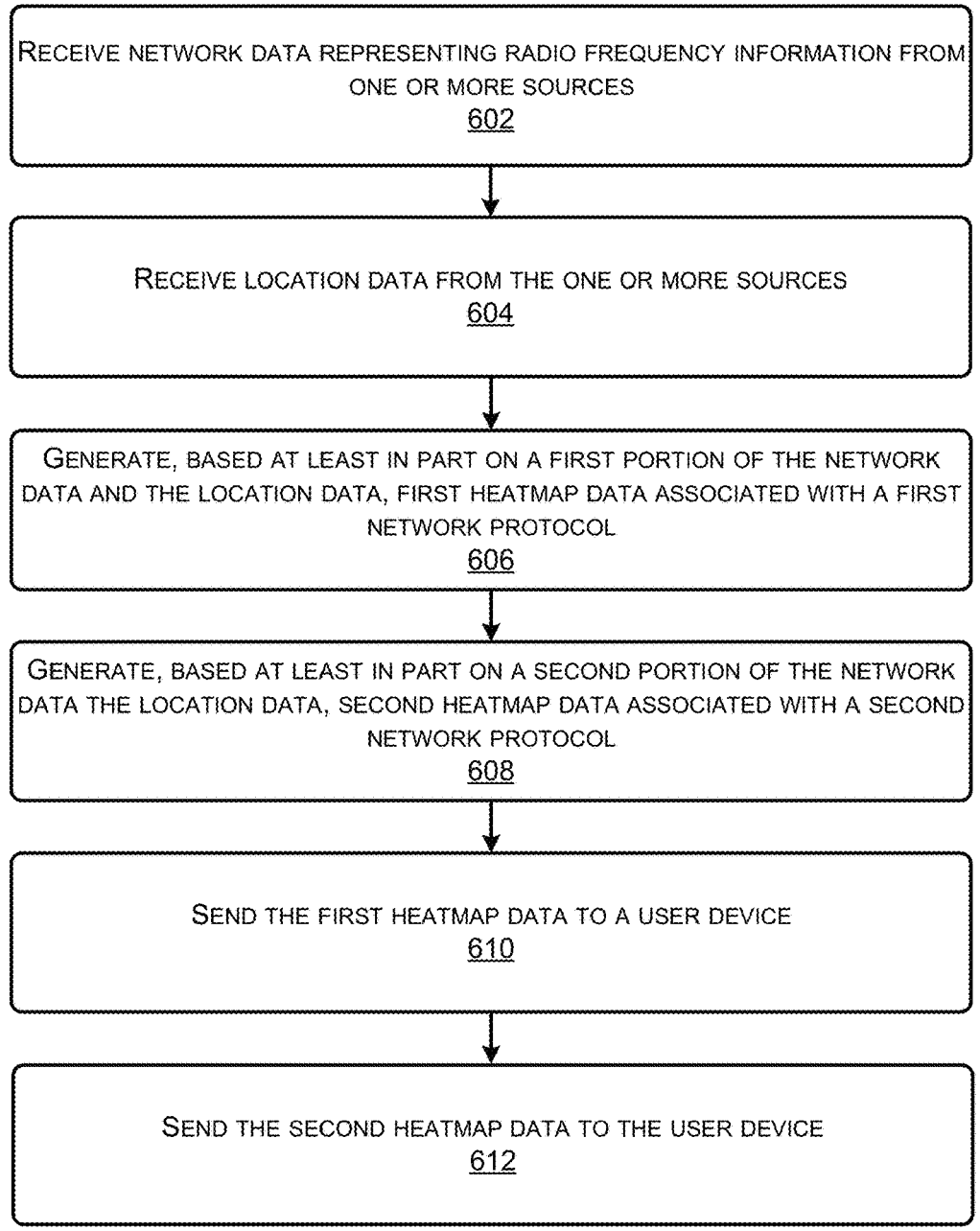
FIG. 6 illustrates a flow diagram of an example method for generating heatmaps using radio frequency information, in accordance with the present concepts.

FIG. 6 illustrates a flow diagram of an example method 600 for generating heatmaps using radio frequency information, in accordance with the present concepts. An operation 602 represents receiving network data representing radio frequency information from one or more sources. For instance, the electronic device(s) 106 may receive the network data from the one or more sources. As discussed above, the one or more sources may include, but are not limited to, user devices, network devices, sensors, and/or the like. The network data may represent RF information that is measured by the one or more sources.

An operation 604 represents receiving location data from the one or more sources. For instance, the electronic device(s) 106 may also receive the location data from the one or more sources. The location data may represent the location(s) of the one or more sources, where the location(s) are related to the radio frequency information.

An operation 606 represents generating, based at least on a first portion of the network data and the location data, first heatmap data associated with a first network protocol. For instance, the electronic device(s) 106 may use the first portion of the network data, which represents RF information associated with the first network protocol, and the location data to generate the first heatmap data. As described herein, the first heatmap data may represent characteristics associated with the first network protocol at various locations within an environment. In some instances, the first heatmap data may further represent recommendation(s) that the electronic device(s) 106 determine using the characteristics.

An operation 608 represents generating, based at least on a second portion of the network data and the location data, second heatmap data associated with a second network protocol. For instance, the electronic device(s) 106 may use the second portion of the network data, which represents RF information associated with the second network protocol, and the location data to generate the second heatmap data. As described herein, the second heatmap data may represent characteristics associated with the second network protocol at various locations within the environment. In some instances, the second heatmap data may further represent recommendation(s) that the electronic device(s) 106 determine using the characteristics.

An operation 610 represents sending the first heatmap data to a user device and an operation 610 represents sending the second heatmap data to the user device. For instance, the electronic device(s) 106 may send, to the user device 104, the first heatmap data and the second heatmap data. In some examples, the electronic device(s) 106 initially send the user device 104 an identifier associated with downloading the first heatmap data and/or the second heatmap data. The electronic device(s) 106 then send the first heatmap data and/or the second heatmap data based on receiving a request from the user device 104. In some examples, the electronic device(s) 106 initially determine that the user device 104 has connected to a specific network device, such as a network device associated with an entrance (e.g., a lobby) of the environment. The electronic device(s) 106 may then send the first heatmap data and/or the second heatmap data to the user device 104 via the network device.

It should be noted that, in some examples, the method 600 may repeat starting back at operation 602. For instance, the electronic device(s) 106 may continue to receive new network data and use the new network data to update the first heatmap data and/or the second heatmap data. The electronic device(s) 106 may then send the updated first heatmap data and/or the updated second heatmap data to the user device 104.

Figure 7:
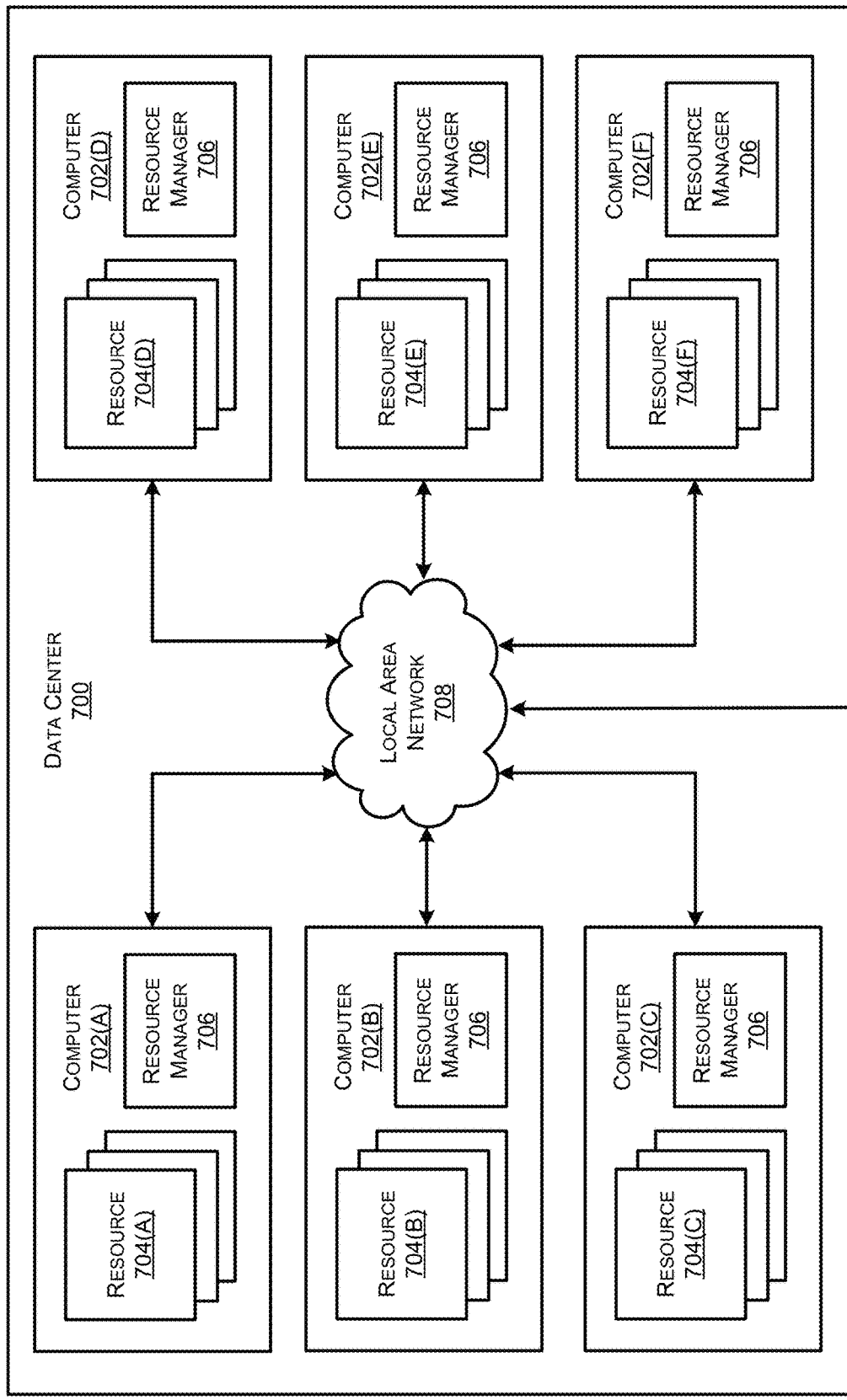
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 7 includes several computers 702A-702F (which might be referred to herein singularly as "a computer 702" or in the plural as "the computers 702") for providing computing resources. In some examples, the resources and/or computers 702 may include, or correspond to, any type of networked device described herein, such as the electronic device(s) 106. Although, computers 702 may comprise any type of networked device, such as servers, switches, routers, hubs, bridges, gateways, modems, repeaters, access points, hosts, etc.

The computers 702 can be standard tower, rack-mount, or blade server computers configured appropriately for providing computing resources. In some examples, the computers 702 may provide computing resources 704 including data processing resources such as virtual machine (VM) instances or hardware computing systems, database clusters, computing clusters, storage clusters, data storage resources, database resources, networking resources, and others. Some of the computers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single computer 702. Computers 702 in the data center 700 can also be configured to provide network services and other types of services.

In the example data center 700 shown in FIG. 7, an appropriate local area network (LAN) 708 is also utilized to interconnect the computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the computers 702A-702F in each data center 700, and, potentially, between computing resources in each of the computers 702. It should be merely illustrative and that other implementations can be utilized.

In some examples, the computers 702 may each execute one or more application containers and/or virtual machines to perform techniques described herein. For instance, the containers and/or virtual machines may serve as server devices, user devices, and/or routers in the cloud computing network 102.

In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regard to FIG. 8.

Figure 8:
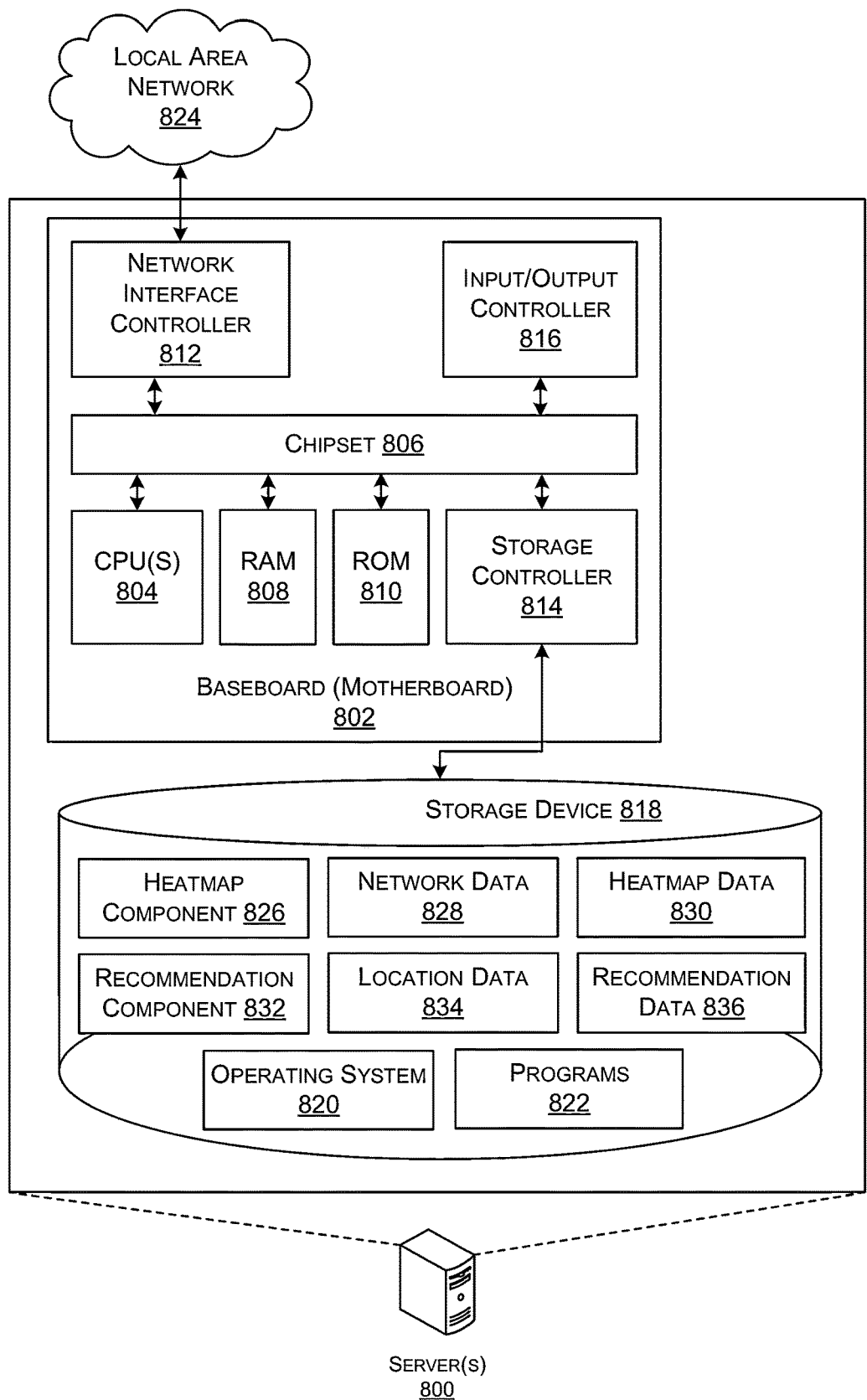
FIG. 8 is a computer architecture diagram showing an illustrative computer hardware architecture for implementing a server computing device that can be utilized to implement aspects of the various technologies presented herein.

FIG. 8 is a computer architecture diagram showing an illustrative computer hardware architecture for implementing a server computing device 800 that can be utilized to implement aspects of the various technologies presented herein. The electronic device(s) 106, discussed above, may include some or all of the components discussed below with reference to the server computing device 800.

To begin, the server computer 800 can be standard tower, rack-mount, or blade server computers configured appropriately for providing the computing resources described herein. As mentioned above, the computing resources provided by a cloud computing network, data center, or the like can be data processing resources such as VM instances or hardware computing systems, database clusters, computing clusters, storage clusters, data storage resources, database resources, networking resources, and others. Some of the servers 800 can also be configured to execute a resource manager capable of instantiating and/or managing the computing resources. In the case of VM instances, for example, the resource manager can be a hypervisor or another type of program configured to enable the execution of multiple VM instances on a single server computer 800. Server computers 800 in a data center can also be configured to provide network services and other types of services.

The server computer 800 includes a baseboard 802, or "motherboard," which is a printed circuit board to which a multitude of components or devices can be connected by way of a system bus or other electrical communication paths. In one illustrative configuration, one or more central processing units (CPUs) 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory (ROM) 810 or non-volatile RAM (NVRAM) for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as a local area network 824. The chipset 806 can include functionality for providing network connectivity through a Network Interface Card (NIC) 812, such as a gigabit Ethernet adapter. The NIC 812 is capable of connecting the computer 800 to other computing devices over the network. It should be appreciated that multiple NICs 812 can be present in the computer 800, connecting the computer to other types of networks and remote computer systems.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI (SAS) interface, a serial advanced technology attachment (SATA) interface, an FC interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by the computer 800, and or any components included therein, may be supported by one or more devices similar to computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 3-5. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

The server computer 800 may also store, in the storage device 818, a heatmap component 826. The heatmap component 826 may be configured to analyze network data 828 (which may include, and/or represent, the data 208) received from one or more sources (e.g., the user devices 202, the network devices 204, the sensor 206, etc.). Based on the analysis, the heatmap component 826 may be configured to generate heatmap data 830 representing heatmaps for different network protocols. In some instances, the heatmap data 108, the heatmap data 302, the heatmap data 326, and/or the heatmap data 342 may include at least a portion of the heatmap data 830.

As further illustrated in the example of FIG. 8, the server computer 800 may also store, in the storage device 818, a recommendation component 832. The recommendation component 832 may use location data 834 representing the locations of user devices in order to recommend network protocols and/or network devices for the user devices. The server computer 800 may then send recommendation data 836 representing the recommendations to the user devices.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:
   receiving network data representing radio frequency (RF) information associated with one or more networks;
   receiving location data indicative of a location of a client device associated with the network;
   generating, based at least in part on a first portion of the network data and the location data, first heatmap data associated with a first network protocol;
   generating, based at least in part on a second portion of the network data and the location data, second heatmap data associated with a second network protocol;
   providing the first heatmap data to the client device; and
   providing the second heatmap data to the client device.

2. The method of claim 1, wherein:
   the first network protocol includes a Wi-Fi Protocol; and
   the second network protocol includes Fifth Generation (5G) Cellular Network Protocol.

3. The method of claim 1, wherein:
   the RF information includes a first characteristic associated with the first network protocol at the location within an environment and a second characteristic associated with the second network protocol at the location within the environment;
   the first characteristic comprises at least one of:
      a first signal strength associated with the first network protocol;
      a first throughput associated with the first network protocol;
      a first data packet drop rate associated with the first network protocol; or
      a first data packet retry rate associated with the first network protocol; and
   the second characteristic comprises at least one of:
      a second signal strength associated with the second network protocol;
      a second throughput associated with the second network protocol;
      a second data packet drop rate associated with the second network protocol; or
      a second data packet retry rate associated with the second network protocol.

4. The method of claim 1, wherein the location data represents a first location associated with the client device, further comprising:
   receiving sensor data associated with the client device;
   determining, based at least in part on the location data and the sensor data, a second location at which the client device will be located at a future time;
   generating, based at least in part on the second location, third heatmap data associated with the first network protocol;
   generating, based at least in part on the second location, fourth heatmap data associated with the second network protocol;
   sending the third heatmap data to the client device; and
   sending the fourth heatmap data to the client device.

5. The method of claim 1, further comprising:
   determining, based at least in part on the first heatmap data, the second heatmap data, and the location data, that the first network protocol is more optimal than the second network protocol for the client device to communicate;
   generating recommendation data indicating the first network protocol; and
   sending the recommendation data to the client device.

6. The method of claim 1, wherein providing the first heatmap data to the client device includes sending an identifier associated with downloading the first heatmap data to the client device.

7. The method of claim 1, further comprising:
   determining that the client device connected to a specific hub device in an environment of the client device,
   wherein the first heatmap data and the second heatmap data are provided to the client device based at least in part on the client device connecting to the specific hub device.

8. The method of claim 1, wherein providing the client device with the first heatmap data includes exchanging, via the one or more networks and with the client device, at least one of an Extensible Markup Language (XML) file populated with the first heatmap data or a JavaScript Object Notation (JSON) file populated with the first heatmap data.

9. A system comprising:
   one or more processors; and
   one or more non-transitory computer-readable media storing computer-executable instructions that, when executed by the one or more processors, cause the one or more processors to perform operations of:
      receiving network data representing radio frequency (RF) information associated with one or more networks;
      receiving location data indicative of a location of a client device associated with the network;

generating, based at least in part on a first portion of the network data and the location data, first heatmap data associated with a first network protocol;

generating, based at least in part on a second portion of the network data and the location data, second heatmap data associated with a second network protocol;

providing the first heatmap data to the client device; and providing the second heatmap data to the client device.

10. The system of claim 9, wherein:

the first network protocol includes a Wi-Fi Protocol; and the second network protocol includes Fifth Generation (5G) Cellular Network Protocol.

11. The system of claim 9, wherein:

the RF information includes a first characteristic associated with the first network protocol at the location within an environment and a second characteristic associated with the second network protocol at the location within the environment;

the first characteristic comprises at least one of:
  a first signal strength associated with the first network protocol;
  a first throughput associated with the first network protocol;
  a first data packet drop rate associated with the first network protocol; or
  a first data packet retry rate associated with the first network protocol; and the second characteristic comprises at least one of:
  a second signal strength associated with the second network protocol;
  a second throughput associated with the second network protocol;
  a second data packet drop rate associated with the second network protocol; or
  a second data packet retry rate associated with the second network protocol.

12. The system of claim 9, wherein the location data represents a first location associated with the client device, and wherein the operations further comprise:

receiving sensor data associated with the client device;

determining, based at least in part on the location data and the sensor data, a second location at which the client device will be located at a future time;

generating, based at least in part on the second location, third heatmap data associated with the first network protocol;

generating, based at least in part on the second location, fourth heatmap data associated with the second network protocol;

sending the third heatmap data to the client device; and sending the fourth heatmap data to the client device.

13. The system of claim 9, the operations further comprising:

determining, based at least in part on the first heatmap data, the second heatmap data, and the location data, that the first network protocol is more optimal than the second network protocol for the client device to communicate;

generating recommendation data indicating the first network protocol; and sending the recommendation data to the client device.

14. The system of claim 9, wherein providing the first heatmap data to the client device includes sending an identifier associated with downloading the first heatmap data to the client device.

15. The system of claim 9, wherein:

the system includes one or more devices in a cloud provider network; or the system includes one or more control-plane devices associated with a data center.

16. A method comprising:

receiving network data representing radio frequency (RF) information associated with one or more networks;

receiving location data indicative of a location of a client device associated with the network;

generating, based at least in part on a portion of the network data and the location data, heatmap data associated with a first network protocol and a second network protocol; and providing the client device with access to the heatmap data.

17. The method of claim 16, wherein:

the RF information includes a first characteristic associated with the first network protocol at the location within an environment and a second characteristic associated with the second network protocol at the location within the environment; and the first characteristic comprises at least one of:
  a first signal strength associated with the first network protocol;
  a first throughput associated with the first network protocol;
  a first data packet drop rate associated with the first network protocol; or
  a first data packet retry rate associated with the first network protocol.

18. The method of claim 16, wherein:

the first network protocol includes a Wi-Fi Protocol; and the second network protocol includes Fifth Generation (5G) Cellular Network Protocol.

19. The method of claim 16, wherein providing the client device with the heatmap data includes sending an identifier associated with downloading the heatmap data to the client device.

20. The method of claim 16, wherein providing the client device with access to the heatmap data includes exchanging, via the one or more networks and with the client device, at least one of an Extensible Markup Language (XML) file populated with the heatmap data or a JavaScript Object Notation (JSON) file populated with the heatmap data.

* * * * *